United States Patent Office 3,459,945
Patented Aug. 5, 1969

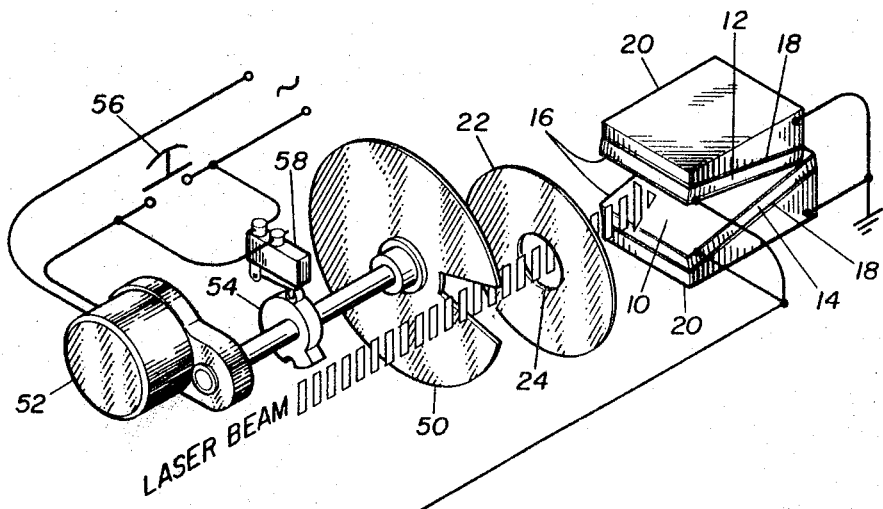
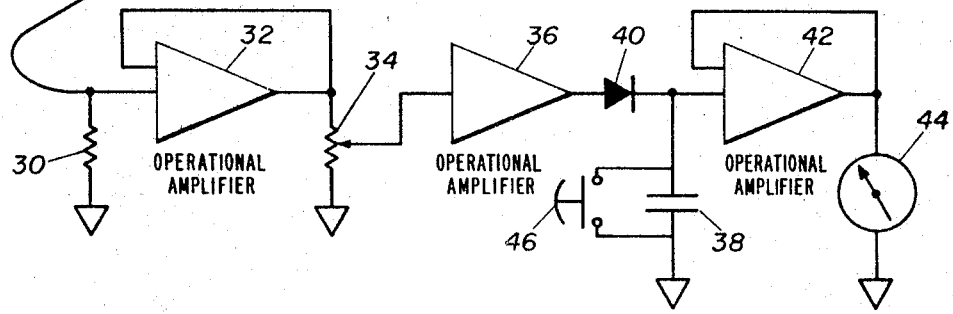

3,459,945
LASER CALORIMETER WITH CAVITATED PYROELECTRIC DETECTOR AND HEAT SINK
Robert W. Astheimer, Westport Township, Fairfield County, and Robert E. Buckley, Norwalk, Conn., assignors to Barnes Engineering Company, Stamford, Conn., a corporation of Delaware
Filed Nov. 7, 1966, Ser. No. 592,534
Int. Cl. G01j 5/12
U.S. Cl. 250—211                        2 Claims

ABSTRACT OF THE DISCLOSURE

A laser calorimeter is formed from pyroelectric material in the shape of a cavity and having electrodes on both the inside and outside. The inside electrode is blackened so as to better absorb radiation while the outside electrode is in good thermal contact with a heat sink to dissipate thermal energy. A shutter is provided when it is desired to measure continuous wave lasers.

---

This invention relates to a laser calorimeter for measuring the energy in laser beams.

Two of the principal methods of detection which are used to measure the output from a laser beam are the photodetector and the calorimeter. The photodetector produces an electrical output which reproduces the incident flux transient of the laser beam. This waveshape is integrated with respect to time to provide a measure of total energy content of the pulse. To obtain accuracy in this method requires very high frequency response of the photodetector and its associated circuitry, as well as precautions to prevent damage to the photodetector. This is usually accomplished by viewing the laser flux after impingement on some diffusion device which reduces the flux density of the beam. Furthermore, the spectral response of the photodetector is not uniform, and the attenuation produced by the diffusion screen or other flux attenuator must be corrected.

In the calorimetric method, the laser energy is absorbed on a blackened receiver in the form of a disc or cavity, and the temperature rise produced is measured by some type of thermometer such as a thermocouple. This is a more accurate means of measuring total energy, but is still subject to errors. One of the difficulties encountered which is serious for both high and lower power inputs is that the laser beam strikes a part of the disc or cavity and thereby heats up only the portion of the disc or cavity which it strikes. The local heat then diffuses through the rest of the receiver. Since the heat from the laser beam requires time to diffuse through the receiver, a measurement cannot be made until the receiver reaches a uniform temperature. As a practical matter, before this happens some of the energy of the receiver is lost because of heat losses which are already occurring due to leakage error. The leakage error can be partially calibrated out by always reading the output at a fixed time after a laser pulse is applied, but some error still remains because the total heat lost during the equalization time depends upon where the beam strikes the receiver. For example, if the laser beam impinges a disc or cavity near a support there will be a greater initial heat loss than if it impinges far away from the support.

It is an object of the present invention to provide a laser calorimeter which is free of the leakage error and at the same time has high sensitivity in laser energy measurement.

It is a further object of this invention to provide a laser calorimeter which is simple to operate and from which it is easy to obtain readings.

In carrying out this invention in one illustrative embodiment thereof, a cavity formed from pyroelectric material is provided which is electroded on both the inside and outside, with the inside electrode being blackened to absorb radiation from laser beams which are directed thereon and whose energy is desired to be measured. The aforesaid structure provides a pyroelectric detector in which the entire cavity itself is a detector. A heat sink is provided in good thermal contact with the outer electrode, and a peak voltage storing circuit is connected to receive the output of the electrodes of the pyroelectric detector. A meter is connected to the peak voltage storage circuit for providing a reading of the energy level of the laser beam applied to the pyroelectric detector. A shutter is provided when it is desired to measure continuous wave lasers.

The invention, together with further objects an advantages thereof, will be better understood by reference to the specification taken in connection with the accompanying drawing.

The drawing is a schematic diagram of an illustrative embodiment of the laser calorimeter of this invention.

A number of advantages of the present invention reside in the fact that a pyroelectric element functions as both the reeciver and the temperature readout mechanism of the calorimeter, and as a result thereof will give a constant output regardless of where the laser beam strikes the receiver, or of heat losses which normally occur.

The pyroelectric detector is comprised of a spontaneously polarized ferroelectric material such as barium titanate having electrodes covering opposite surfaces thereof, with one of the surfaces blackened so that radiation is absorbed thereby. A change in polarization due to heating of the ferroelectric by radiation gives rise to a pyroelectric voltage across the electrodes, thus making the detector suitable for the measurement of radiation. The significant point about the voltage which is developed across the electrodes of the pyroelectric detector is that it is a direct measure of the total energy of the radiation applied, and is independent of the distribution over the pyroelectric material, either temporally or spatially. The voltage developed in response to the application of radiation will remain constant for a reasonable period. The reason that the voltage output remains constant as the heat diffuses through the pyroelectric material until it reaches a heat sink is that the pyroelectric generation of charge is a volumetric process. Assuming that a pulse of energy strikes just a portion of the surface of the pyroelectric material, initially there will be a large heat rise at a small area, producing a certain amount of charge on the electrodes of the pyroelectric detector. As the heat diffuses out radially and into the pyroelectric material, the temperature rise in the initial local region will fall, but a larger volume of the pyroelectric material will now be heated up to a lesser degree. However, the net charge developed will be the same, and it remains constant regardless of the distribution of heat until the heat reaches a heat sink. This is one of the primary advantages of the pyroelectric calorimeter of the present invention, that the entire receiver is the temperature sensor, and responds to the average temperature regardless of its distribution.

In accordance with the present invention, a pyroelectric detector for measuring radiation from laser beams which are directed thereon comprises a cavity formed by a pyroelectric material which has electrodes on the inside and on the outside of the cavity, with the inside electrodes being blackened to absorb radiation from the laser beam. The piezoelectric material may be barium titanate, Rochelle salt, lithium sulfate, triglycene sulfate, or any other suitable material which exhibits the pyroelectric effect. Barium titanate is preferable for the present application in laser calorimetry, due to the ruggedness of the material and its ability to survive large overload as well as its high dielectric constant. The cavity which is formed in the dielectric material may be spherical, conical, cylindrical, or wedge-shaped.

Referring now to the drawing, the receiver or cavity 10 for laser beams directed therein whose energy is to be measured is formed using plates 12 and 14 forming a Mendenhall wedge. The plates 12 and 14 are electroded with electrodes 16 on the inner surfaces thereof and 18 on the outer surfaces thereof, which outer electrodes 18 are in contact with heat sinks 20. The receiver or cavity 10 is illustrated in wedge form because of its ease of construction, therefore making it a preferable embodiment. A stop 22 having an aperture 24 therein may be placed at the mouth of the cavity 10 to restrict incoming radiation to the central portion of the cavity or wedge 10. The inner electrodes 16 which form the cavity 10 are blackened to insure high absorptivity to incoming radiation and will present a detector which is spectrally flat over the wavelengths in the infrared and visible region which are desired to be measured. The electrodes 16 are connected in parallel aiding to form the equivalent of a single capacitor. The same result would apply for a single body of pyroelectric materials shaped in wedge shape and electroded, or in any of the other forms previously mentioned. The charge on the capacitor, of course, would depend on the radiation received from the laser beam whose energy is desired to be measured. The output of the pyroelectric detector is loaded with a resistor 30 to adjust the output voltage of the detector as a function of applied radiation level. The output of the pyroelectric detector is high impedance, and in order to match this impedance, an operational amplifier 32 is employed and connected for unit gain to provide a high impedance input and a low impedance output. The output of the operational amplifier which performs the isolation function is applied to a gain control potentiometer 34 to provide for range selection. Another operational amplifier 36 is connected to the potentiometer 34, and is used as part of the gain control network. It will be appreciated that the potentiometer 34 merely illustrates the range selection function, and more elaborate switching arrangements may be required to provide several steps of amplification for providing the range control function. The output of the operational amplifier 36 charges a capacitor 38 through a diode 40. The voltage on capacitor 38 is connected to another operational amplifier 42, connected as a high impedance device, thus a gain of 1, and the resultant voltage is read on a voltmeter 44. A switch 46 is connected across capacitor 38 to short out any charge thereon after various readings have been taken. The silicon diode 40 and capacitor 38 along with the operational amplifier 42 and meter 44 provide a peak storing voltmeter.

The operation for measuring the energy of a laser beam is quite simple. For example, for a pulsed laser beam measurement, the switch 46 is depressed to bleed any charge from capacitor 38, and the pulsed laser beam whose energy is desired to be measured is directed to the cavity or receiver 10. The charge applied to the pyroelectric detector due to the pulsed laser beam is processed through the circuit and stored in the capacitor 38 and read out on the meter 44. If a continuous wave laser beam is to be measured, the device is provided with a shutter 50 driven by a motor 52 which also drives a cam 54. The shutter 50 is a segmented disc which applies radiation from the laser beam into the receiver cavity 10 during a portion of the revolution of the motor. When a motor switch 56 is depressed, power is applied to the motor, which drives the cam 54 off of a microswitch 58 and completes the motor circuit so that the switch 56 does not have to be held in place. The motor continues to rotate through one revolution until the cam 54 engages the microswitch again and opens the power circuit to the motor. The segmented disc 50 has an opening which exposes the pyroelectric detector when it rotates in front of it to the laser beam directed thereto, and the size or width of the opening determines the exposure time of the detector. Of course the shutter arrangement is not necessary, and will not be used, for pulsed laser beam measurements, but only for continuous wave laser beam measurement. The shutter assembly may be attached separately when the c.w. laser beam is desired to be measured.

Accordingly, a simple laser calorimeter is provided which employs a pyroelectric thermal absorbing element which may be utilized to measure either pulsed or c.w. laser beams. It has high sensitivity, wide dynamic range, and provides both integrated and transient response to a pulsed laser input. It is also free of thermal errors which are inherent in other types of calorimeters.

What we claim as new and desire to secure by Letters Patent is:

1. A laser calorimeter for measuring the energy in laser beams comprising
    (a) a pyroelectric detector comprising a cavity formed by pyroelectric material which has electrodes on the inside and the outside of said cavity with the inside electrode being blackened to absorb radiation from laser beams which are directed into said cavity and whose energy is desired to be measured,
    (b) a heat sink in good thermal contact with the outer electrode of said cavity,
    (c) a peak voltage storing circuit,
    (d) means for coupling the output of said pyroelectric detector to said peak voltage storing circuit, and
    (e) a meter connected to said peak voltage storing circuit for providing a reading of the energy level of a laser beam applied to said pyroelectric detector.

2. The structure set forth in claim 1, including a shutter means positioned in front of said cavity, and means for operating said shutter to permit radiation from a laser beam to be applied to said cavity.

References Cited

UNITED STATES PATENTS

| | | | |
|---|---|---|---|
| 2,299,260 | 10/1942 | Sivian | 136—214 |
| 2,920,208 | 1/1960 | Crump | 250—83.3 |
| 2,953,690 | 9/1960 | Lawson | 250—211 |
| 3,024,695 | 3/1962 | Nisbet | 250—211 |
| 3,282,100 | 11/1966 | Baker | 88—22.5 |
| 3,288,997 | 11/1966 | McCall | 250—83.3 |
| 3,293,435 | 12/1966 | Huth | 250—83.3 |
| 3,313,154 | 4/1967 | Bruce | 88—23 |

RALPH G. NILSON, Primary Examiner

C. N. LEEDOM, Assistant Examiner

U.S. Cl. X.R.

73—190; 136—214; 250—83; 356—226